United States Patent [19]

Timmons

[11] Patent Number: 5,062,457

[45] Date of Patent: Nov. 5, 1991

[54] CORRUGATED AIR HOSE ASSEMBLY

[75] Inventor: Robert W. Timmons, Cypress, Calif.

[73] Assignee: McDonnell Douglas Corporation, Long Beach, Calif.

[21] Appl. No.: 347,576

[22] Filed: May 5, 1989

[51] Int. Cl.$^5$ .......................................... F16L 11/112
[52] U.S. Cl. .................................... 138/125; 138/109; 138/122; 138/132; 138/174; 285/158
[58] Field of Search ........................ 138/109, 121–126, 138/132, 137, 174; 285/7, 158, 226, 235, 423, 192, 903, 910, 919, 921, 923; 15/257 A; 277/203, 207 A, 201, 183, 178, DIG. 4

[56] References Cited

U.S. PATENT DOCUMENTS

| 1,538,007 | 5/1925 | Schellin | 285/921 |
| 1,824,499 | 9/1931 | Reichenbecher | 138/109 |
| 2,703,109 | 3/1955 | Saville | 138/109 |
| 2,866,479 | 12/1958 | Mahady et al. | 285/235 |
| 3,047,026 | 7/1962 | Kahn | 138/137 |
| 3,540,747 | 11/1970 | Stjernstrom | 285/192 |
| 3,920,049 | 11/1975 | Lippert et al. | 138/109 |
| 4,196,755 | 4/1980 | Kutnyak et al. | 138/174 |
| 4,523,738 | 6/1985 | Raftis et al. | 138/109 |
| 4,706,712 | 11/1987 | Oglesby et al. | 138/137 |

FOREIGN PATENT DOCUMENTS

| 836203 | 6/1960 | United Kingdom | 138/125 |
| 1019370 | 2/1966 | United Kingdom | 138/122 |

Primary Examiner—Harvey C. Hornsby
Assistant Examiner—C. Cooley
Attorney, Agent, or Firm—Donald E. Stout; Gregory A. Cone; John P. Scholl

[57] ABSTRACT

A duct for aircraft use which has ease of use and will resist degradation over time. Silicone impregnated cloth is supported by a nylon helix and covered with a protective braiding of KEVLAR ®, a commonly used polyamide fiber. The resulting tube can be strung through tight openings. The duct is equipped with a flexible flange for secure engagement. The flexible flange can be collapsed to reduce the cross sectional area for fitting through narrow openings.

3 Claims, 2 Drawing Sheets

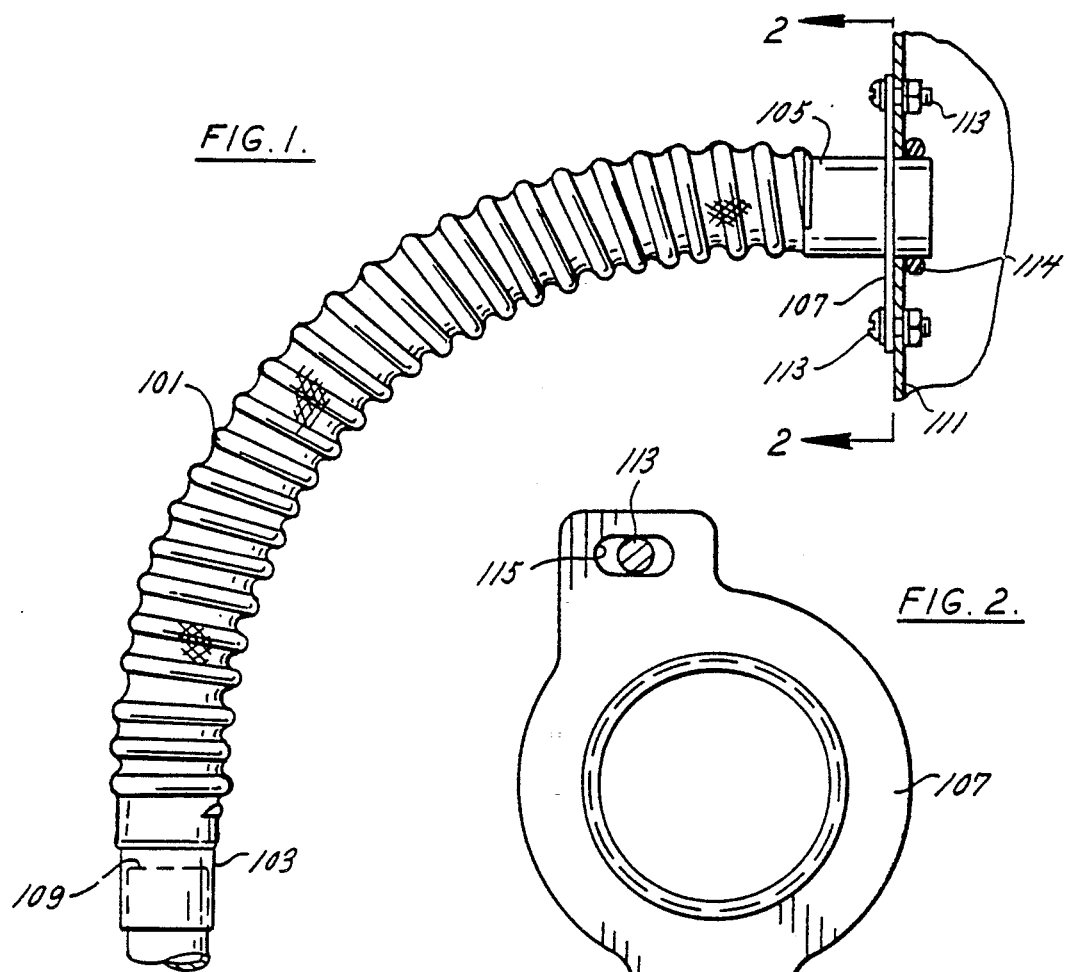
FIG. 1.
FIG. 2.
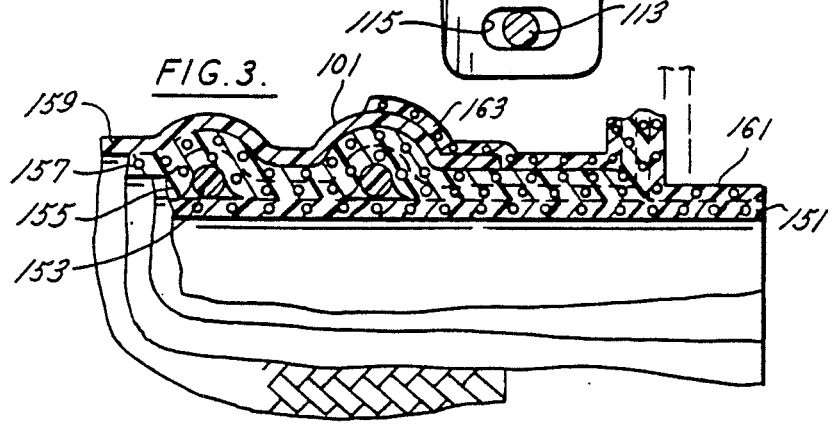
FIG. 3.
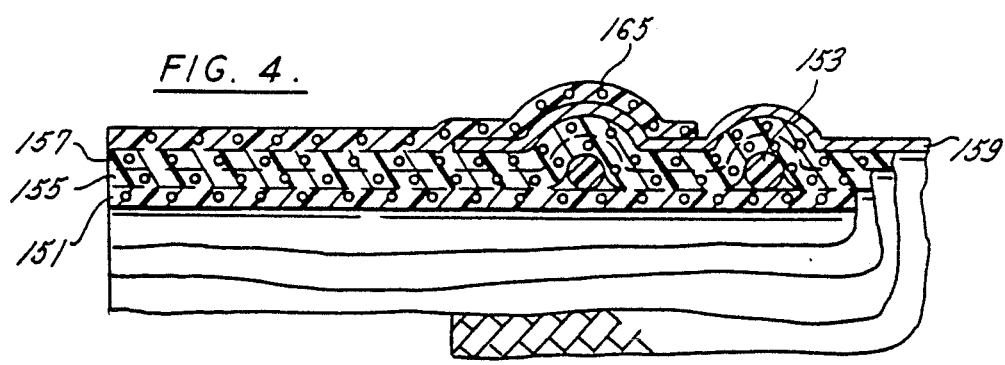
FIG. 4.

CORRUGATED AIR HOSE ASSEMBLY

BACKGROUND OF THE INVENTION

The inherent space, weight, and materials standards relating to aircraft service dictate specialized designs for what would otherwise become a perfunctory operation. In the case of an aircraft instrument rack, maximum utilization of the available space for instruments dictates a convoluted, difficult area in which to fit ventilation ducts. Ideally, the ducts will be sturdy, yet flexible enough to fit any path, no matter how tortous Federal Aviation Administration requirements must be met, and the duct will ideally be non-metallic in order to avoid electromagnetic interference with avionics equipment.

Many ducts and tubes have been used in the past to form a flow path for many types of fluids. Each application has its related requirements. For example, U.S. Pat. No. 4,691,741, entitled "Shroud for Aircraft Duct" to Affa et al., discloses a shroud especially resistive if Skydral hydraulic fluid, which forms an air insulating gap. U.S. Pat. No. 4,699,567, entitled "Fan Duct Casing" to Stewart, discloses a containment ring for a gas turbine engine fan duct.

U.S. Pat. No. 4,615,359, entitled "Shroud for Aircraft Duct" to Affa et al., discloses a wrapping for the titanium shrouds of aircraft ducts to guard against corrosion. U.S. Pat. No. 4,121,606, entitled "Inflatable Air Inlet Duct" to Holland et al., discloses a movable air inlet duct, while U.S. Pat. No. 4,185,373, entitled "Method of Manufacturing an Inflatable Air Inlet Duct" to Holland et al., discloses the method of manufacture of same.

U.S. Pat. No. 4,582,297, entitled "Tape and Method for Measuring and/or Pulling Cable" to Conti, discloses a tape made of warp and weft threads made of polyamide fibers, for use in pulling a duct along an overhead support. U.S. Pat. No. 4,693,941, entitled "Reinforced Poly(Ethylene Terepthalate) Compositions" to Ostapchenko, discloses polyethylene terepthalate compositions usable as a protective covering.

U.S. Pat. No. 4,714,094, entitled "Gas-Oil Pressure Acumulator" to Tovagliaro, discloses the wrapping of a metallic vessel with composite carbon fibers, especially Kevlar. U.S. Pat. No. 4,717,764, entitled "Two Stage Melt Polymerization Process for Making Polymers Containing Aromatic Amide Groups" to Ward, discloses a two stage process of reacting and then heating until the desired viscosity is reached. U.S. Pat. No. 4,718,818, entitled "Containment Structure" to Premont, discloses a structure wrapped with fiber, especially Kevlar, under tension to withstand the force of particles impinging upon it.

U.S. Pat. No. 4,755,082, entitled "Removable Bottom Founded Structure" to Beskow et al., discloses a Kevlar woven tube for use in a drilling platform. U.S. Pat. No. 4,734,007, entitled "Fan Casing and Fan Blade Loading/Unloading" to Perry, discloses woven fibrous material for a fan casing utilizing Kevlar fibers.

Each of the above applications was appropriate for its associated environment, but a duct meeting stringent aircraft requirements which also has a high degree ease of use is still lacking in the aircraft industry.

SUMMARY OF THE INVENTION

This invention involves a duct for aircraft use which has ease of use, meets Federal Aviation Administration guidelines, and will resist degradation over time. Silicone impregnated cloth is supported by a nylon helix and covered with a protective braiding of Kevlar, a commonly known trademark name for a polyamide fiber. The resulting tube can be "strung" through tight openings. The duct is equipped with a flexible flange for secure engagement. The flexible flange can be collapsed to reduce the cross sectional area for fitting through narrow openings.

BRIEF DESCRIPTION OF THE DRAWINGS

The structure and method of operation of the invention, together with additional advantages thereof, will be best understood from the following description of the preferred embodiment when read in connection with the accompanying drawings in which:

FIG. 1 illustrates the straight line configuration of the duct of the present invention;

FIG. 2 illustrates an end view of the flange of the duct of FIG. 1;

FIG. 3 illustrates a cross section of the flanged end of the duct of FIG. 1. illustrating the layered construction thereof;

FIG. 4 illustrates a cross section of the non-flanged end of the duct of FIG. 1. illustrating the layered construction thereof; and, FIG. 5 illustrates the elbow configuration of the duct of the present invention.

DETAILED DESCRIPTION OF THE PREFERRED EMBODIMENT

Figure 5:
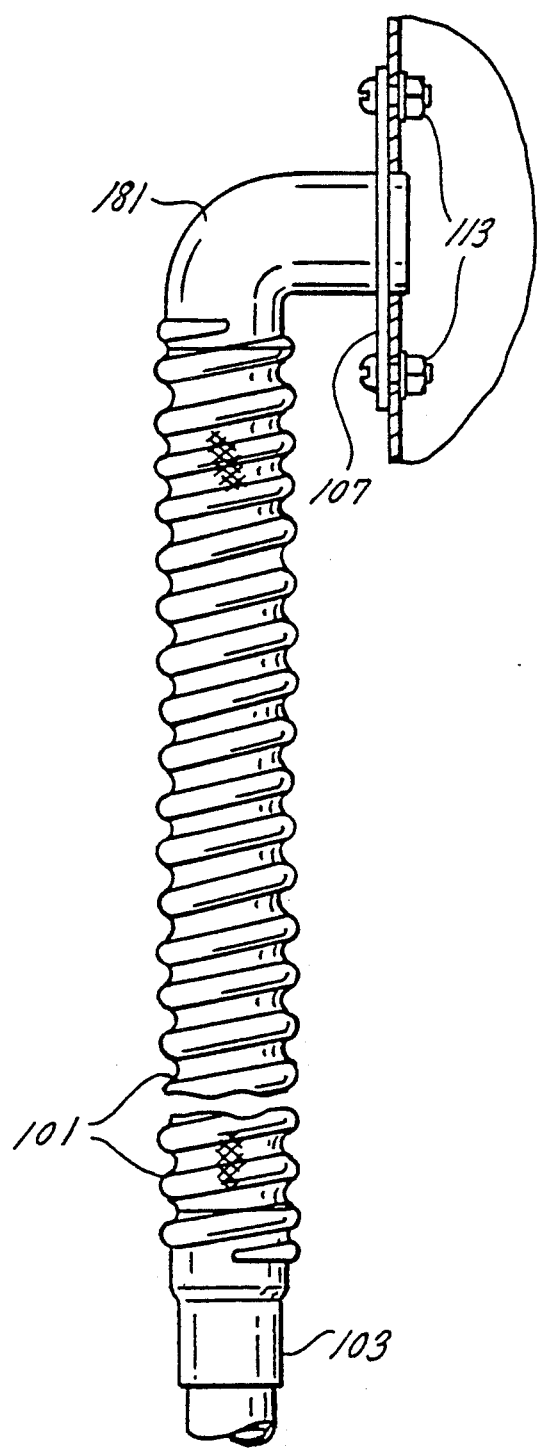

Referring to the FIG. 1, the straight line configuration for the duct of the present invention is illustrated. A main rib shaped body 101 is terminated at one end by a female friction fit smooth member 103 and is terminated at the other end by a smooth flange member 105 connected to a flange 107. A dashed male section 109, from a similar connecting tube (not shown) is shown within female friction fit smooth member 103. Flange 107 is shown connected to a section of aircraft support wall 111, by means of bolts 113 inserted through flange 107. Typically, aircraft avionics which, if present, would receive the cooling air, would be mounted to the right of aircraft support wall 111. Also shown in FIG. 1 is an optional foam "o" ring 114 to the right of aircraft wall 111. Such a ring can be used to form a more secure seal at the point of engagement with the particular system to be cooled (not shown).

Referring to FIG. 2, an end view of the duct of the present invention illustrating flange 107 is shown. Flange 107 is fitted with a pair of oval apertures 115 to enable bolts 113 to extend therethrough as shown in FIG. 1.

Referring to FIG. 3, a cutaway section of the flanged end of the duct of the present invention is shown. Beginning at the inside of the duct, an inner layer of silicon impregnated cloth 151 forms an essentially smooth internal surfaced flow path. Outside silicon impregnated cloth 151, a spiral coil 153, typically made of nylon is wound. Spiral coil 153 is surrounded by two additional plies of silicone impregnated cloth, layers 155 and 157. A protective layer of polyamide fiber, such as Kevlar, is shown at layer 159. Layer 159 is typically a braided cloth, as is illustrated near the center bottom of FIG. 3.

The flange 107 is formed by turning layers 155 and 157 outward, away from the axial center of the duct at a point near the flange end of smooth flange member 105. A separate layer of silicone impregnated fabric 161 extends from the open end of the flanged end of the duct of the present invention and turns outward parallel to the outwardly extending portions of layers 155 and 157. Another layer of silicone impregnated fabric 163 extends from contact with Kevlar braided layer 159 to the flange 107 area, then turning outward parallel to the outwardly extending portions of layers 155 and 157 to also form a part of flange 107. Excess lengths of layers 155, 157, 161, and 163 are trimmed to form the flange 107 of FIG. 2, or other shape as desired. The additional layer of silicone impregnated cloth 163 is added near the flange both to hold Kevlar layer 159 in place, as well as to further reinforce flange 107.

Referring to FIG. 4, an orientation similar to that of FIG. 3 is illustrated. As in FIG. 3, layers 151, 155, 157 and Kevlar layer 159 is present, as is coil 153. Here, however, no flange is present. Therefore a layer 165 of silicone impregnated cloth is added from the end of the duct to a point adequately overlapping silicone layer 159 to hold it in place.

Referring to FIG. 5, an embodiment of the duct of the present invention is shown having an elbow shaped smooth flange member 181. The remaining portions of the duct, the body 101, female friction fit smooth member 103, flange 107, etc. is the same as shown in FIG. 1. Note that both FIGS. 1 and 5 illustrate the cross hatched Kevlar braid along the surface of the body 101.

The foregoing disclosure and description of the invention are illustrative and explanatory thereof, and various changes in the mode of implementation of the duct of the present invention scheme, and variations in the type of construction thereof (e.g., materials used, number of plies and their orientation, as well as methods of manufacture) and all other details of the illustrated embodiments may be made without departing from the spirit and scope of the invention.

What is claimed is:

1. A duct comprising:
    an inner tube having a longitudinal axis, comprising a substantially smooth inner surface, formed of one layer of silicone impregnated cloth;
    a non-metallic spiral coil surrounding said inner tube, said longitudinal axis of said inner tube forming the axis about which said spiral coil extends;
    an outer tube having at least two layers of silicone impregnated cloth surrounding said spiral coil;
    a polyamide protective covering, located concentrically outwardly of, and extending over a substantial portion of said outer tube;
    a flange, near at least one end of said duct;
    a first section of silicone impregnated cloth, surrounding a portion of said polyamide protective covering and a portion of said outer tube sufficient to hold said polyamide protective coating in place at said one end of said duct having said flange; and,
    a second section of silicone impregnated cloth, located between said flange and said one end of said duct, said second section of silicone impregnated cloth surrounding a portion of said outer tube, said flange being formed integral with said first selection of silicone impregnated cloth, said second section of silicone impregnated cloth, and said two layers of silicone impregnated cloth of said outer tube.

2. The duct as recited in claim 1 wherein said non-metallic spiral coil is made of nylon.

3. The duct as recited in claim 1 wherein said flange contains at least one aperture therethrough to facilitate attachment to a surface.

* * * * *